(No Model.) 2 Sheets—Sheet 1.
A. G. WATERHOUSE.
PROCESS OF AND APPARATUS FOR DISTILLING LIQUIDS.
No. 585,943. Patented July 6, 1897.
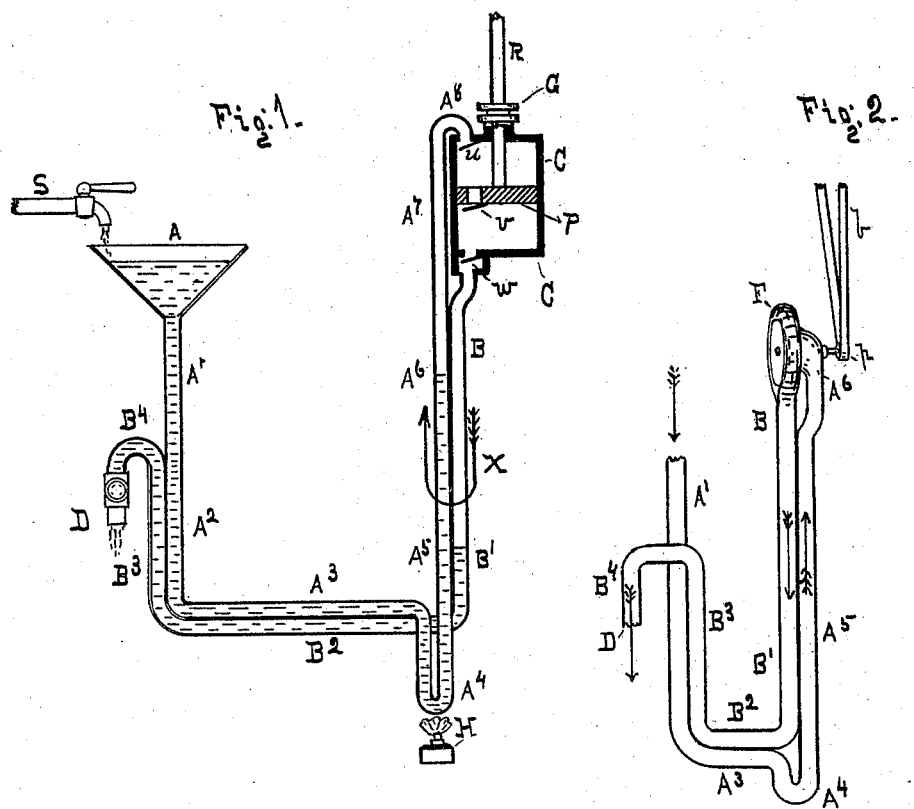
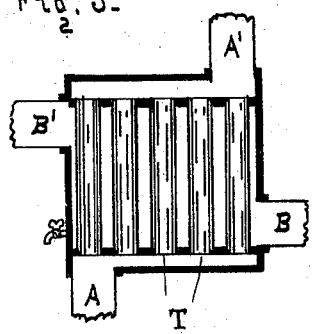
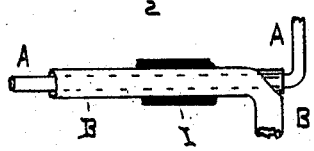
Witnesses,
W. H. Capel.
D. H. Decker.
Inventor
Addison G. Waterhouse.

(No Model.) 2 Sheets—Sheet 2.
A. G. WATERHOUSE.
PROCESS OF AND APPARATUS FOR DISTILLING LIQUIDS.
No. 585,943. Patented July 6, 1897.
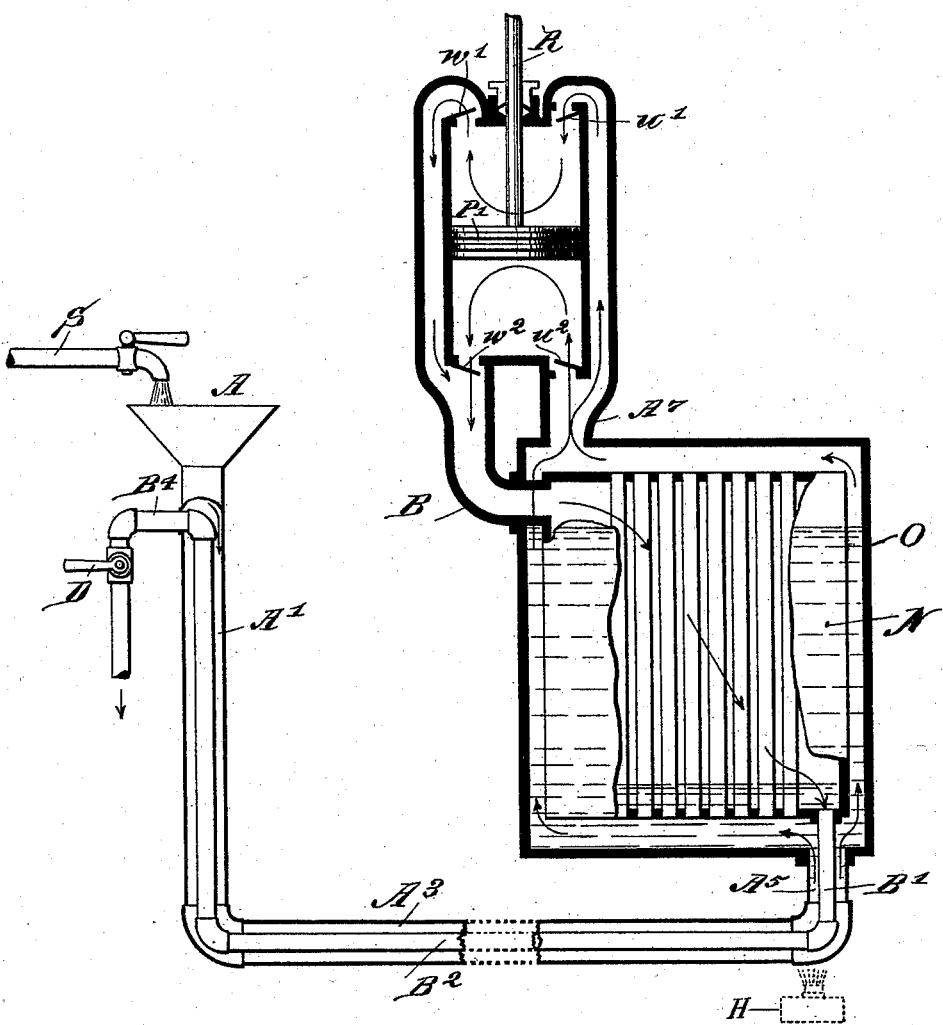
WITNESSES:
C. L. Belcher
J. F. Mothershead
INVENTOR:
Addison G. Waterhouse.
BY
ATTORNEY.

UNITED STATES PATENT OFFICE.

ADDISON G. WATERHOUSE, OF HARTFORD, CONNECTICUT, ASSIGNOR OF ONE-HALF TO A. WELLS CASE AND LAWRENCE W. CASE, OF HIGHLAND PARK, CONNECTICUT.

PROCESS OF AND APPARATUS FOR DISTILLING LIQUIDS.

SPECIFICATION forming part of Letters Patent No. 585,943, dated July 6, 1897.

Application filed January 9, 1896. Serial No. 574,802. (No model.)

*To all whom it may concern:*

Be it known that I, ADDISON G. WATERHOUSE, a citizen of the United States, and a resident of Hartford, in the county of Hartford and State of Connecticut, have invented certain new and useful Improvements in Processes of and Apparatus for Distilling Liquids, of which the following is a specification.

My invention relates to distilling liquids of any sort, and has for its object a very material reduction of the cost of distilling as now practiced. I produce this reduction in cost by effecting evaporation and condensation mechanically in contradistinction to the present heating and cooling process requiring direct application of heat of combustion and a cooling medium.

With this object in view my invention consists in a process of and apparatus for distilling liquids wherein an external mechanical force is employed to assist the evaporation of the liquid and the condensation of the vapor and all the heat of condensation is utilized to assist in the evaporation. This mechanical force may be applied in many ways, of which two are illustrated, wherein said force is utilized to decrease the tension upon the liquid to be evaporated and to increase it upon the vapor to be condensed.

My improvement in the art of distilling, therefore, further consists in mechanically reducing the pressure upon the liquid to be vaporized and mechanically increasing the pressure upon the vapor to be condensed and transferring the entire heat of condensation to the liquid to be vaporized.

My invention further consists in the construction and combination of parts to be hereinafter fully described and claimed.

It is known that heretofore a still has been designed in which the latent heat of the distilled vapors has been used to assist the evaporation of the liquid to be distilled by compressing said vapors into a vessel surrounded by the liquid to be distilled, but in that instance the heat in the liquid of condensation has been wasted by the direct discharge of said liquid and the loss has been made up by using the exhaust-steam from the pumping-engine to heat the liquid to be distilled. By the present invention this waste of energy is obviated and a far greater efficiency obtained.

In order to fully set forth my invention, reference will be had to the accompanying drawings, which form a part of this specification, and in which—

Figure 1 is a graphic illustration of my invention for distilling by direct application of mechanical energy. Fig. 2 is a similar illustration of the invention, showing a variation in the mechanism for applying the mechanical energy. Figs. 3 and 4 are details of construction, showing different modes of thermally connecting parts of the apparatus. Fig. 5 illustrates a practical form of apparatus for carrying out the invention.

In describing the operation of my invention we will assume the work of distilling water and first refer to the form of apparatus shown in Fig. 1. The water to be distilled first enters the funnel A from the source S. Then it passes down the pipe $A'$, $A^2$, and $A^3$, then down the lower bend to $A^4$, when it rises up past $A^5$ to $A^6$ or $A^7$, where it finds its level. Then an initial charge of heat is applied at H until the water in the pipe at $A^5$ and $A^6$, which I call the "boiling-chamber," is caused to boil and enough steam is produced to pass up through the pipe at $A^8$, down through the open-valved pump C, and into the pipes B and $B'$, which part of this pipe I call the "condensing-chamber." The steam continues on through this pipe to $B^2$, $B^3$, and $B^4$, where it would pass out, but is condensed into water because of the heat passing by conduction to the cold water entering at A. The two pipes are placed together, as will be hereinafter described, so that the steam condenses into water, which fills the pipe at $B^2$ and backs up to $B'$, the height of the water in both pipes being shown by broken lines, the steam filling the pump C and the pipes above the water-line. At this point power is applied to the piston P of the pump C, working it up and down. When it moves down, the valve $v$ closes, and the steam under the piston is forced into the pipe or condensing-chamber B, which compresses the steam in B, while at the same time the same piston movement rarefies the steam in the boiling-chamber $A^5 A^6$, so that the boiling-point is lowered below 212°, while the temperature in B is raised above 212°, so that the higher temperature in B will cause heat to pass by conduction to the water in chamber $A^5$ and $A^6$ and supply the heat required for converting the water into steam. As fast as the heat in B is drawn off, the steam in B, being under pressure, will condense into water at a higher temperature than that of the boiling water in $A^5$ and $A^6$, so that the sum of the heat liberated by the condensation of the steam in B and the heat in the condensed water which is above the boiling-point in $A^5$ and $A^6$ and the heat of the outgoing distilled water transferred to and returned by the inflowing water to be distilled will supply the amount of heat required for converting the water in $A^5$ and $A^6$ into steam, and this condition will be maintained by the constant working of the pump. The heat H, applied at $A^4$, can be discontinued, except as far as may be required to supply what heat is lost by surface radiation or conduction, which loss can be reduced to a minimum by properly coating the apparatus with non-conducting material, as indicated at I in Fig. 4. This loss will partly, if not quite, be made up by the heat evolved from the power expended in performing the work. If heat is applied, it is important that it should be applied not to the water as it is entering the apparatus, since it would not then be able to absorb the heat from the outgoing water, and not directly to the boiler or condenser, as it would only raise the pressure of each and lead to the necessity for a complicated regulator, but to the inflowing water after it has absorbed all the heat from the outgoing water and before it enters the boiler, so that it will enter at a temperature required for maintaining a given working pressure in the distil. This disposition of the supplemental heater is seen in Fig. 1 at H and indicated in dotted lines in Fig. 5.

The long arrow X shows the circuit taken by the latent heat from the steam, which is up from the water in $A^5$ and $A^6$, in the steam, then down through the pump in a compressed form into the condensing-chamber, where it passes back by conduction to the water in $A^5$ and $A^6$, where it is again used. The distilled water in passing out through pipe $B^2$, $B^3$, and $B^4$ is partly held back by the cock D, so that the pressure in B can be maintained, the heat in the distilled water in passing out through pipe $B^2$, $B^3$, and $B^4$ being transferred by conduction to the cold water as it passes in pipe $A^2$ and $A^3$, so no heat is lost.

Fig. 2 shows part of a similar apparatus in which a rotary fan F or blower is used to rarefy the steam in pipe $A^5$ and $A^6$ and at the same time compress it in pipe B and B'.

Fig. 3 shows a form of constructing what I have called the "boiling and condensing chambers," in which, instead of using pipes side by side, so that the heat can pass from one to the other, I use a form of surface condenser. The passage from $A^5$ extends through the tubes T to $A^7$, while the passage from B to B' will be within the outer case and outside of the tubes T, so that a greater surface will be offered for the heat to pass from the compressed steam in B and B' to the water to be boiled in the tubes T.

Fig. 4 shows a way of placing the pipe $A^2$ $A^3$ inside of the pipe $B^2$, so that the heat of the distilled water in the latter will be imparted to the cool water in the former.

In the apparatus shown in Fig. 5 a condenser of ordinary tubular form is indicated at N as located within an outer chamber O, which may be termed the "generator" or "evaporating-chamber." A force-pump having piston P' and rod R is connected at its exhaust side by pipe $A^7$ with the generator, as through valves $u'$ $u^2$, and at its discharge side through valves $w'$ $w^2$ by pipe B with the condenser. To the generator leads the feed-pipe A A' $A^3$ $A^5$ from a source of liquid-supply S, and from the condenser the discharge-pipe B' $B^2$ $B^4$ leads, preferably, and as here shown, through the center of the feed-pipe and has its discharge controlled by cock D.

The feed and discharge pipes will in practice be made of considerable length and by preference in the form of coils. The outer pipe and likewise the generator will be jacketed by some good non-conductor of heat, as above stated in connection with Fig. 4. The intimately-associated pipes just mentioned constitute what may be termed the "exchange" and form an important feature of the invention. As indicated in Fig. 1 at H, sufficient heat to make up for loss by radiation may be applied to the feed-water as it is about to enter the condenser. For this purpose a loop $A^4$ is represented at the inner end of the feed-pipe. This heat, however, may be applied to the inner end of the feed-pipe, in the manner indicated at H in Fig. 5, since the amount required for the purpose is very small.

Many other devices than those above described may be used for thermally connecting the boiling and condensing chambers and the induction and eduction pipes $A^2$ and $B^2$, respectively, the main object in these constructions being to transfer as completely as possible the heat of condensation and the heat in the liquid of condensation to the boiling liquid and to the liquid on its way to the boiling-chamber.

The pressure in both boiler and condenser may average above or below one atmosphere and may be raised to several atmospheres, and in practice it is found to be more economical to work at high pressure, owing apparently to the fact that the steam then has a higher degree of humidity.

My invention may be carried out in many different ways, those shown being chosen simply to illustrate the principle of the invention.

In another application for patent filed by me May 19, 1897, Serial No. 637,181, I have described an apparatus for heating a gas or a liquid, such as water, in which all of the gas or liquid which passes through pipes or passages to the heating-point or heater passes directly away from the heater through pipes or passages surrounding or within the pipes by which the liquid passes to the heater, or otherwise related thereto to produce a thermal exchange between the incoming and outgoing liquid such that all of the applied heat taken up by the liquid at the heater shall be given back to the incoming liquid, so that in effect the only heat lost and which it is necessary to supply at the heater after the apparatus is once started into operation is that due to radiation from the apparatus; and in the same application I have shown a variation of the said apparatus and method wherein all of the liquid is vaporized at the heating-point, but all the heat taken up at the heating-point is preserved in the apparatus by causing all of said vapor to give up its latent heat liberated at condensation to the liquid on its way to the heating-point, and all of the heat remaining in the condensate is transferred to the incoming liquid passing into and out of the apparatus and is at practically the same temperature, and, as before, the only heat required to keep the apparatus running is that which supplies that escaping by radiation. As illustrative of this, I have shown in said application both the apparatus which is illustrated herein and also an apparatus wherein the vapor produced is condensed by lowering its temperature by contact with a cooling medium—to wit, inflowing liquid—and without necessarily employing any mechanical power, as herein described.

My present application is accordingly confined to the specific method and apparatus for practicing my invention in distilling and by the use of a mechanical power in distilling, as herein described and claimed. In my other application I have made broader or more generic claims to methods and apparatus for heating and distilling, wherein, as before mentioned, the entire heat is conserved and used over and over again in the operation, and the additions of heat are such only as are required to make up for such radiation as may be permitted to exist.

What I claim as my invention is—

1. The combination with an evaporating-chamber and a condensing-chamber, of a pump having its inlet connected with the former and its outlet connected with the latter, and means providing for the transference of the heat of condensation from the latter chamber to the contents of the former, the feeding and discharge pipes respectively of said chambers being in close proximity to each other for the purpose set forth.

2. The process of distilling consisting in heating the liquid to the boiling-point, withdrawing the vapor from said liquid and compressing the same, transferring the heat from the compressed vapor back to the boiling liquid, and transferring the heat of the liquid produced by the condensation of said vapor to the liquid on its way to the evaporating-chamber, substantially as set forth.

3. The process of distilling water or other liquid, consisting in applying heat thereto to bring it to the boiling-point, then mechanically withdrawing the vapor from the boiling liquid and compressing the same, thereby raising its temperature above that of the boiling liquid, then by conduction transferring substantially the entire heat of compression to the heat to be distilled, and continuously withdrawing and compressing the vapor and returning its heat to the liquid to be distilled without the further application of external heat other than may be required to replace that lost by radiation, substantially as set forth.

4. In a still, the combination of a boiling and a condensing chamber thermally connected, an inlet and an outlet pipe thermally connected outside the still, and leading to and from said chambers, and a pump leading from the boiling to the condensing chamber, substantially as and for the purposes set forth.

5. In a still, the combination of the chamber $A^5$, $A^6$, connected to or surrounded by the chamber B, B', and pump C, communicating from one to the other, and two passages thermally connected together, one forming an inlet for one chamber and the other an outlet for the other chamber, substantially as and for the purposes set forth.

6. The method of distilling by mechanical power, consisting of compressing the vapor of distillation, returning its heat to the liquid to be distilled, and conducting the heat from the hot distilled liquid, to the cold liquid, on its way to the still, substantially as and for the purpose set forth.

7. In a still run by mechanical energy, the method of retaining all of the heat used as a medium for distilling by compressing the vapor and returning its latent heat to the liquid to be distilled, and transferring by conduction the heat of the outgoing condensed liquid to the inflowing liquid to be distilled.

8. The combination of pipes or passages adapted to exchange heat between the hot distilled liquid as it leaves the still and the cold liquid as it enters the still, with the means described for returning the latent heat of the vapor to the liquid to be distilled, substantially as described.

Signed at New York, in the county of New York and State of New York, this 4th day of January, A. D. 1896.

ADDISON G. WATERHOUSE.

Witnesses:
WM. H. CAPEL,
D. H. DECKER.